United States Patent [19]

Agrawal et al.

[11] Patent Number: 5,042,004

[45] Date of Patent: Aug. 20, 1991

[54] PROGRAMMABLE LOGIC DEVICE WITH SUBROUTINE STACK AND RANDOM ACCESS MEMORY

[75] Inventors: Om Agrawal; Kapil Shankar, both of San Jose, Calif.

[73] Assignee: Advanced Micro Devices, Inc., Sunnyvale, Calif.

[21] Appl. No.: 464,560

[22] Filed: Jan. 16, 1990

Related U.S. Application Data

[63] Continuation of Ser. No. 836,782, Mar. 6, 1986, abandoned.

[51] Int. Cl.[5] ............... G06F 15/00; G06F 12/00
[52] U.S. Cl. .................. 364/900; 364/965.4; 364/965.1; 364/716; 307/465; 340/825.83
[58] Field of Search ... 364/200 MS File, 900 MS File, 364/716; 307/465, 466; 340/825.83

[56] References Cited

U.S. PATENT DOCUMENTS

| 3,803,587 | 4/1974 | Mead | 364/716 X |
|---|---|---|---|
| 3,983,538 | 9/1976 | Jones | 364/900 |
| 4,075,707 | 2/1978 | Wilmer | 364/900 |
| 4,195,352 | 3/1980 | Tu et al. | 364/900 |
| 4,334,269 | 6/1982 | Shibasaki et al. | 364/200 |
| 4,348,737 | 9/1972 | Cukier et al. | 364/900 |
| 4,354,228 | 10/1982 | Moore et al. | 364/200 |
| 4,438,492 | 3/1984 | Harmon, Jr. et al. | 364/200 |
| 4,493,029 | 1/1985 | Thierbach | 364/200 |
| 4,628,477 | 12/1986 | Burrows | 364/900 |
| 4,684,830 | 8/1987 | Tsui et al. | 307/465 |
| 4,742,252 | 5/1988 | Agrawal | 307/465 |
| 4,766,532 | 8/1988 | Pearson et al. | 364/200 |

FOREIGN PATENT DOCUMENTS 57-203336 12/1982 Japan .
59-28727 2/1984 Japan .

OTHER PUBLICATIONS

Hicks, "Sequence Controller Using Programmable Logic Array", IBM TDB, vol. 20, No. 2, Jul. 1977, pp. 743-744.

Eggebrecht et al., "Programmable Logic Array with Provision for Interrupts", IBM TDB, vol. 20, No. 2, Jul. 1977, pp. 745-746.

Advanced Micro Devices, Inc., "Programmable Array Logic Handbook" (1984), pp. 2-29)-(2-40).

Primary Examiner—Thomas C. Lee
Attorney, Agent, or Firm—Fliesler, Dubb, Meyer & Lovejoy

[57] ABSTRACT

Method and apparatus providing a programmable logic device which has a high level subroutine stack element and a random access memory suitable for control applications. The method utilizes high level constructs bearing a one-to-one relationship to the architecture of the apparatus so that the design of the controller is facilitated resulting in a rapidly-executed program which is easy to comprehend, verify and document. Subroutines are readily implemented by the controller by virtue of its last-in, first-out stack and a state counter which allow the contents of the counter to be "pushed" onto the stack upon invocation of the subroutine and "popped" from the stack upon return from the subroutine. Provision of the random access memory allows the controller to store information supplied from an external device, such as a central processing unit. The operation of the controller can be readily modified according to the control information stored in the memory by use of a high level language RAMREAD construct. The random access memory also provides scratch pad capability for the controller so that information written to a memory location, under control of a programmable OR array, can be used as a separate, independent counting and timing channel, in an exemplary application. The stack and/or the random access memory are suitable for inclusion in a controller of either a programmable logic array (PLA-), programmable array logic (PAL-), or a programmable read-only-memory (PROM-) based design.

41 Claims, 2 Drawing Sheets

PROGRAMMABLE LOGIC DEVICE WITH SUBROUTINE STACK AND RANDOM ACCESS MEMORY

This application is a continuation of Ser. No. 06/836,782, filed Mar. 6, 1986, now abandoned.

CROSS-REFERENCE TO RELATED, COPENDING APPLICATION

Related, copending application of particular interest to the instant application is U.S. Ser. No. 827,840, entitled "Flexible Programmable Logic Controller" filed Feb. 7, 1986, on behalf of Kapil Shankar and Om Agrawal and assigned to the assignee of the instant application, now U.S. Pat. No. 4,876,640.

FIELD OF THE INVENTION

The present invention relates to programmable logic devices, and more particularly, to such devices suitable for use in control applications, for instance, as sequencers, and having easily-programmable high level logic elements such as a last-in, first-out stack and a random access memory.

BACKGROUND OF THE INVENTION

PAL AND PLA DEVICES

Presently, programmable array logic (PAL) devices, and programmable logic array (PLA) devices find application for controlling digital circuitry, such as in "state machines" or sequencers, requiring flexibility and ease of use. Although such PAL/PLA devices operate with speed and flexibility, they are difficult to program, since they require writing complex Boolean expressions for this purpose. The use of Boolean equations to design the sequencer limits the number of variables available to the designer, typically from eight to sixteen, because of the mathematical difficulties in specifying and simplifying equations having more than eight variables. Moreover, such sequencers require additional external circuitry to provide flexibility as well as additional conditional testing circuitry.

Particular difficulty is encountered when programming and understanding a general PAL or PLA device used to perform higher level logical functions such as counting, state sequencing, branching, or multiple-case testing. No higher level logic blocks, such as program counters, last-in, first-out (LIFO) stacks or memories are available in such devices which can be readily programmed or easily understood. Subroutines are a highly-desirable high level language construct, as will be appreciated by those skilled in the art, and provision of a stack affords easy subroutine capability in a control or sequencer program. Omission of a stack means that PAL/PLA-based devices cannot readily support the high level language GOSUB and RETURN constructs. The absence of these higher level elements makes it very difficult to implement sequencers and state machines with high level language-based state machine constructs with PALs and PLAs. Also, lack of these high level elements makes current PAL/PLA device architecture unoptimized for control logic applications.

While to reduce programming effort and to ease understandability, some higher level language (HLL) programming schemes maybe available, there is no direct relationship between such HLL constructs and the underlying hardware. As such, no methodology is available which affords easy design of the microsequencer because no high level constructs are available within the PAL- or PLA-based sequencers corresponding to the high level language constructs most useful to design personnel. Complex, detailed and error-prone Boolean equations must be written presently to accomplish the design of PAL- or PLA-based sequencers and such equations do not bear a one-to-one correspondence to the underlying circuit elements of the PAL- or PLA-based sequencer. Because of all these reasons, PAL/PLA devices are not used for large complex control applications.

PROM-BASED DEVICES

Usually, programmable read-only memory (PROM)-based micro-coded sequencers are used for such control applications. However, such microsequencers have many deficiencies. In particular, PROM-based microsequencers do not provide adequate high level elements for state machine/sequencer design and their architecture is unrelated to the higher level constructs which designers prefer to use.

One such high level element, a programmable counter, not available in the prior art in PROM-based microsequencers, is the subject of the related, copending application. The counter provides the designer with such high level control-sequencing constructs as "multi-way" branching, flexible conditional testing and branching, generation of input-dependent outputs, and user-customizable instruction decoding. The resulting device, termed a "programmable logic controller" (PLC), supports a number of high level language constructs with an architecture which bears a strong one-to-one correspondence to the constructs. It avoids the complex architecture of PROM-based microsequencers, having such elements as a testing multiplexer, program counter multiplexer, and an instruction-decode PLA. Such elements also slow execution time of the control or sequencer program and make the program difficult to design and understand.

Another high level element not available in PROM-based microsequencers is a random access memory (RAM). Storage of data within a control sequencer, particularly data which is to be externally updated at certain intervals, entails increased storage locations. In the prior art, this necessitated use of a larger programmable AND and OR arrays than is strictly required for the control function. This resulted from the use, in the prior art, of buried registers for such data storage. Increasing the number of these storage locations results in a very large (exponential) increase in the array size. In turn, the large array makes the control sequencer operate more slowly and increases the cost disproportionately to the resulting gain in storage. Moreover, such storage functionality is not supported by a high level language construed such as READ or WRITE, but must be achieved by writing cumbersome Boolean expressions.

SUMMARY OF THE INVENTION

It is an object of the instant invention to provide a programmable logic device having high level circuit elements such as a LIFO stack and a RAM, which can be used in conjunction with a design methodology allowing development of software having high-level language constructs for programming the controller, the constructs bearing a one-to-one relationship to the underlying architecture of the PLC device.

It is another object of the programmable logic device of the instant invention to employ architecture providing flexible control elements unavailable in PAL- or PLA- or PROM-based devices, specifically a subroutine stack element and a random access memory (RAM element).

It is yet another object of the instant invention to increase the storage capacity of a programmable logic device without substantially increasing the AND array size.

It is another object of the programmable logic device of the instant invention to provide support high level language constructs such as GOSUB, RETURN, RAMREAD and STORE.

It is yet another object of the instant invention to provide circuit elements which can store external data and provide ready updating of such data via logic arrays.

In a programmable logic controller (PLC), as described in the related, copending application, a set of output registers along with a counter and a set of general purpose buried registers constitute the pipeline register of PROM-based microsequencers. The counter in a PLC design provides the functionality of a program counter in the microsequencer design. It also provides the jump address field of the pipeline register. Further, in a PLC device, a programmable AND array performs the addressing functions of the microsequencers, whereas PROM-based microsequencers have fixed AND arrays.

One embodiment of the instant invention is a PLC of the related copending invention having a last-in, first-out (LIFO) stack supporting subroutine. The stack is controlled by a programmable OR array. The number of elements stored in the stack can be varied depending upon the number of nested subroutines required. By PUSHing the contents of the state counter onto the stack and simultaneously loading the state counter with the subroutine jump address, a subroutine branch can be executed. By POPing the state back from the stack to the counter a return from the subroutine can be performed. The PUSH and POP signals of the stack are controlled by the OR array.

The stack provides a very useful, and flexible control structure for a state machine. Means can be provided for supplying the stack condition information to the AND array. For instance, STACK EMPTY and STACK FULL indicators can be fedback to the programmable AND array. This allows implementation of complex control structures such as recursive subroutines.

Improved control structure flexibility is provided in the PLC device having the stack. The stack can implement subroutine calls and branching very efficiently. The stack implementation is based on address pointers. The pointers always address the last in location. The pointer also wraps around when the number of PUSH or POP's exceed the number of stack locations. There is also a signal provided to reset this pointer to zero. This signal is also controlled by the OR array and is used most frequently during system initialization.

Another embodiment of the present invention includes a random access memory (RAM) combined with a PAL- or PLA-based programmable logic device. The RAM is very useful for information storage. It provides a very easy means for storage of externally updatable, typically an external central processing unit (CPU), control information. The operation of the device can be made dependent upon this control information. A user can easily program in software also a custom interface to update this information from the external source.

Provision of the RAM provides additional capability of storage of external data, other than so-called "buried registers". Typically in system designs, the external CPU periodically provides information to the controller device. Some examples of this function are DMA controllers, Interrupt Controllers, and video controllers. The RAM can implement this functionality very effectively. The operation of the controller device can be modified depending upon this control information. Also the user can define in software, custom interface to obtain this information from any kind of external source. Such capability does not exist in PAL-, PLA-, or PROM based devices.

The RAM also provides a scratch pad capability. Any address location can be written to or read from, under the control of the OR array. These locations can be used as separate independent counting and timing channels. Such capability also does not exist in prior art sequencers. These independent, programmable counting and timing channels can be used for a variety of system control functions such as refresh timer for memory controller. Such functionality does not exist in prior art sequencers.

Functionality non-existant in existing PROM based microsequencers is possible in the device of the present invention, such as flexible and simpler control of the RAM, opening new application areas. This functionality can be easily controlled by boolean equations for PALs and PLAs and by software in the case of PLC's.

In another embodiment of the instant invention, the RAM is provided within a PLC of the related, copending invention. Alternative preferred embodiments include the stack and the RAM provided for a PAL- or PLA-based sequencer, or for a PLC.

Provided in a representative embodiment of a programmable logic device of the instant invention, is a combinatorial logic circuit comprising a programmable AND array and a pair of programmable OR arrays. A first OR array generates logic signals to a set of output macrocells and a random access memory (RAM) served by a set of input/output pins. A second OR array generates logic signals to a set of "buried" internal registers, a counter and a last-in, first-out (LIFO) stack. The second OR array provides a high level logic control sequencing function. The signals generated by certain ones of the output macrocells as well as the internal registers, the RAM and the counter are fedback to the AND array via dedicated internal feedback paths.

The AND array of the programmable logic device of the instant invention can be programmed, in conjunction with the programmable OR array, to generate the required control signals. Furthermore, the number of OR terms dependent on a single product term is quite critical. For enhanced speed, it is important to reduce the size of the OR array so as to eliminate the second gate delay as much as possible. A logic device of the instant invention employs two OR arrays, each performing a dedicated function, either output generation, or sequencer control, thereby reducing the size of each OR array.

In another alternative embodiment, a faster device employs a combinatorial logic circuit comprising a programmable AND array and fixed OR arrays.

DETAILED DESCRIPTION OF PREFERRED EMBODIMENT

Figure 1:
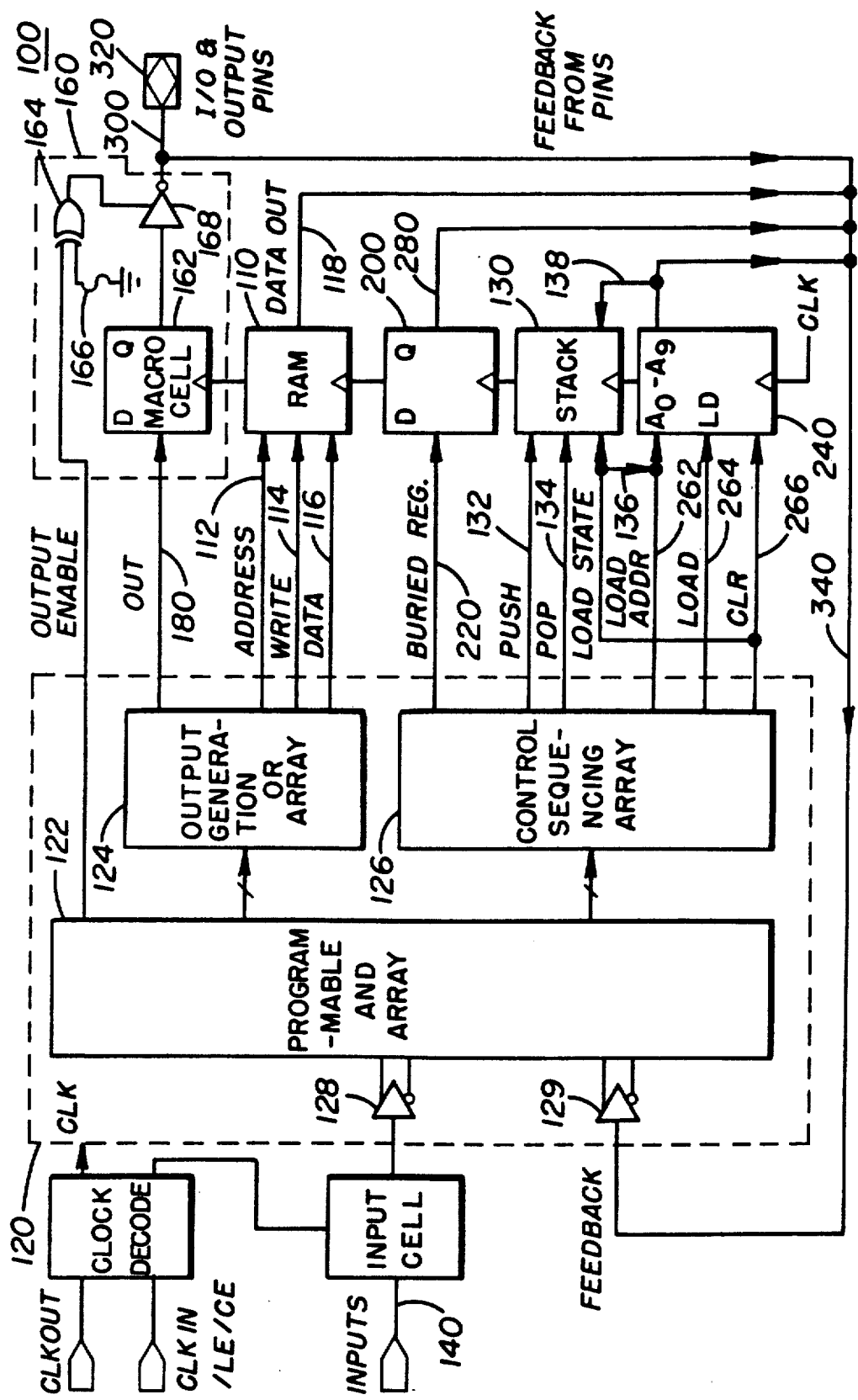
FIG. 1 is a block diagram of an embodiment of a programmable logic device of the instant invention; a Programmable Logic Controller (PLC) having a last-in, first-out stack and a random access memory.

With reference to FIG. 1, a programmable logic controller (PLC) device 100 having a random access memory (RAM) 110 and a subroutine stack 130 high level circuit elements, in addition to a programmable counter 240, is shown. A description of the elements forming the PLC 100 shown in FIG. 1, other than the RAM 110 and the stack 130, is contained in the related, copending application "Flexible Programmable Logic Controller", which description is incorporated by reference herein. To aid in understanding, in the description so-incorporated references to like elements have the same reference numerals as those elements of the instant application.

Following the description of the preferred embodiment illustrated in FIG. 1, are descriptions of alternative embodiments involving PAL- and PLA-based devices employing RAM 110 and/or stack 130.

Briefly, the PLC 100 includes fuse-programmable combinatorial logic circuitry 120 which receives input signals from an external source applied via a set of ten signal lines 140. On the drawing figures, various signal lines are hashmarked, with a numeral adjacent thereto, indicating that a number of signals are conducted in parallel on the lines, even though only one line is shown, the numeral specifying the number of parallel signals. Accordingly, line 140 has the numeral "10" adjacent to a hashmark intersecting line 140. The programmable combinatorial logic circuit 120 can be formed from programmable AND and OR arrays as will be described in detail hereinafter.

A set of twenty-four output macrocells 160, each including an output register 162, receives signals generated by circuit 120 via signal lines 180, as does a set of eight buried registers 200 via signal lines 220. For example, said registers can be conventional flip-flop devices.

A programmable counter 240 also receives signals generated by circuit 120 via signal lines 262, 264 and 266. These signals represent load address and counting control information. Signals representing the contents of the buried registers 200 and the program counter 240 are conducted back, via signal lines 280, to the programmable combinatorial circuit 120 where they form a second input to circuit 120.

Signals representing the contents of output macrocells 160 are conducted via signal lines 300 to input-/output (I/O) pins 320 as well a being conducted back via signal lines 340 to combinatorial circuit 120 where they form a third input to circuit 120. The counter 240 is preferably a Gray-code counter. Since the contents of such a counter changes in only one bit location, state transitions are not subject to instabilities which may cause transient errors in the signals generated at I/O pins 320. Furthermore, this results in improved optimization of the Boolean design equations, since adjacent state product terms involve differences of only one bit, as will be appreciated by those skilled in the art.

Briefly, data signals and dynamic control signals generated by the combinatorial logic circuit 120 are conducted to each of the output macrocells 160 and the macrocell generates a signal therefrom which may be selected from the contents of a register within macrocell 160, or the combinatorial data signal received from circuit 120 and causes this signal, in either an active HIGH or active LOW polarity to be conducted to I/O pin 320 for output and feedback to circuit 120, or the macrocell may cause a signal applied at I/O pin 320 to be conducted via signal line 340 to the logic circuit 120. Each buried register 200, also receives data and dynamic control signals from the logic circuit 120 but is not allocated an I/O pin on which the contents of the register can be generated, however, a signal representing the contents of the register is conducted via feedback path 280 to the logic circuit 120 where it can be used for "state" determination.

The contents of the program counter 240 is similarly fedback to the logic circuit 120 for use in "state" determination and, since the external input signals are also available for logic circuit 120, implementation of both a "Mealy" state machine, in which the next-state determination is based on the current state and the inputs, and a "Moore" state machine, based solely on the current state, is readily performed by the PLC 100 of the present invention. The counter 240 can also perform sequencing functions and is readily controlled via the programmable logic circuit 120. The counter 240 receives a LOAD CONTROL signal generated by circuit 120 and a set of LOAD ADDRESS signals which, upon application of the LOAD CONTROL signal, permits setting of the contents of counter 240 to a programmable "state". Loading of the counter in this manner provides a "state branching" function of the PLC 100. Alternatively, by permanently setting the LOAD CONTROL signal HIGH, the counter 240 can function as a set of extra buried registers. Counter 240 also receives a COUNTER CLEAR (CLR) signal from logic circuit 120, which, when asserted, resets the counter to a predetermined "start" state, such as "OO" Hex.

The PLC 100 of the instant invention includes a RAM 110 used for data storage. RAM 110 receives the CLK timing signal received by registers 162 and 200 and counter 240. An address signal generated by an OR output generation array 124 portion of combinatorial circuit 120 is conducted to the RAM 110 via a signal line 112. In the preferred embodiment, the RAM 110 has eight storage locations and, accordingly, the address signals would be carried on line 112 in a time-multiplexed manner, or alternatively, a set of three signal lines could be used to carry binary-encoded address signals in parallel. A write enable signal generated by OR array 124 is conducted to the RAM 110 via a signal line 114 and a set of eight data signal lines 116 conduct data generated by OR array 124 to RAM 110 for storage therein. Application of the write enable signal causes the data applied via signal lines 116 to be stored in the RAM location specified by the address signals received via signal line 112, upon reception of the next clock signal.

A set of eight data signal lines 118 conduct the data stored within the RAM 110, at the location specified by the address signals on line 112, to a programmable AND array 122 portion of combinatorial circuit 120 via feedback path 340, upon reception of the next clock signal. When no RAM address is specified, a default address of ZERO is used to store or retrieve data from RAM 110.

The data stored in RAM 110, controlled by software as will be explained hereinafter, can be an internal constant or a variable value, or data applied to the AND array 122 via input lines 140. A typical application of RAM 110 is as a "scratchpad", which permits separate programmable counting and timing channels such as is required for a refresh timer for a memory controller.

The PLC 100 of the instant invention also includes a last-in, first-out stack 130 providing subroutine capability to the PLC 100. Stack 130 receives the CLK timing signal received by the RAM 110, the registers 162 and 200, and the counter 240, and on signal line 266, the CLR signal received by the counter 240. A PUSH signal and a POP signal generated by a control sequencing OR array 126 portion of combinatorial circuit 120 is conducted to the stack 130 via signal lines 132 and 134, respectively. The counter 240 receives a set of LOAD STATE signals via signal lines 136, in addition to the LOAD ADDRESS signals received from OR array 126, via signal lines 262. Signals representing the contents of counter 240 are conducted via signal lines 138 to the stack 130.

Figure 2:
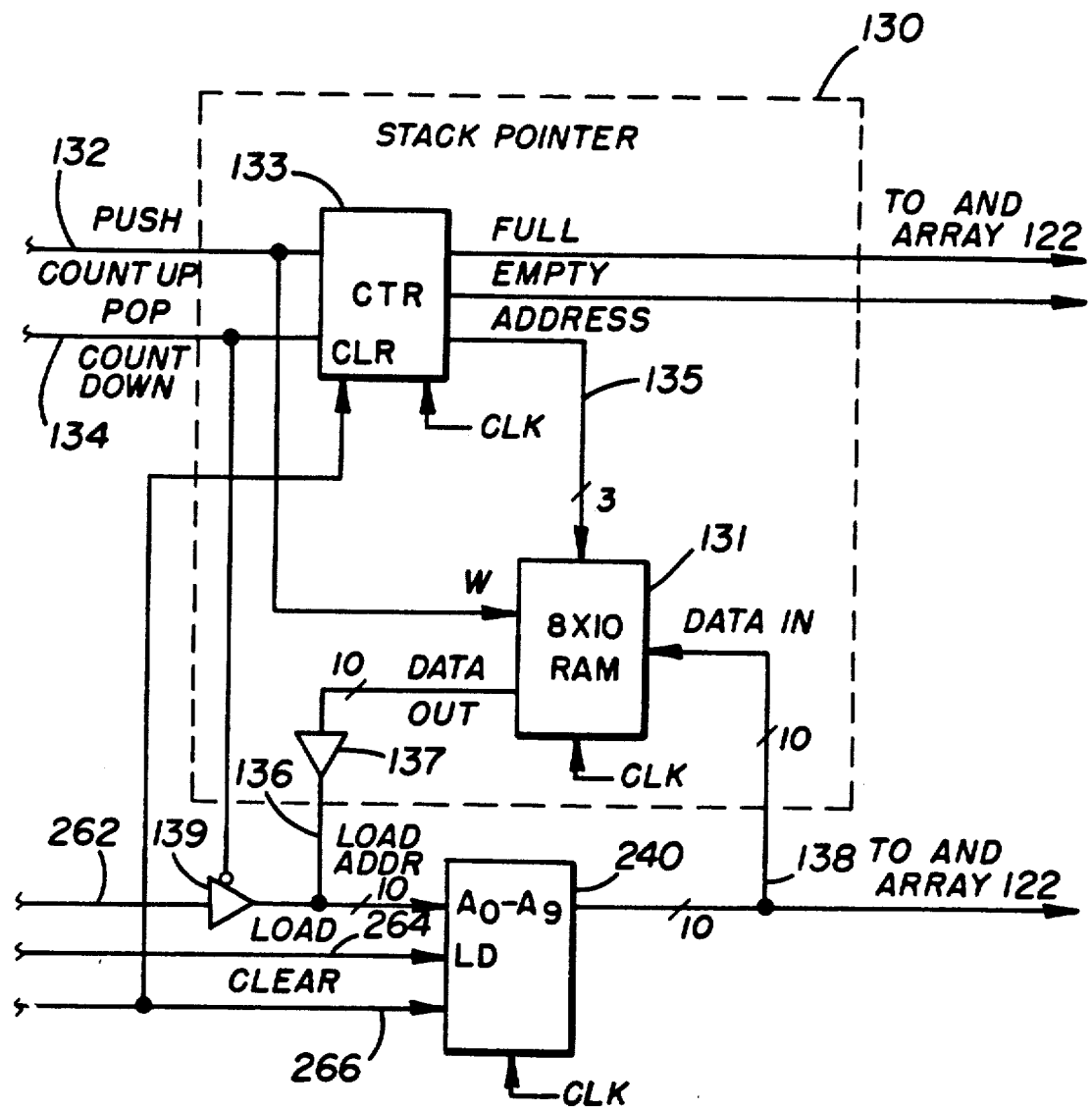
FIG. 2 is a block diagram of the stack mechanism employed in a programmable logic device of the instant invention.

With reference to FIG. 2, one embodiment of the stack 130 is illustrated within the dashed line. A random access memory (RAM) 131, having eight addressable memory locations, each capable of storing a 10-bit word, receives from counter 240 the data word via signal lines 138. A counter (CTR) 133 within stack 130 receives from the OR array 126 the PUSH and POP signals, via lines 132 and 134. The counter 133 is preferably a modulo 8 ring counter and upon reception of a PUSH signal, increments its contents by one (modulo 8), and upon reception of a POP signal, decrements its contents by one (modulo 8); typically synchronized by the CLK signal which the counter 133 receives. The counter 133 also receives the CLR signal generated by the OR array 126 and reception of this signal resets the contents of the counter to ZERO, typically.

The counter 133 generates on signal lines 135 a set of three count value signals, which, encoded via binary, represent the present value "pointed" to in the stack 130. These count value signals are conducted to an address port of RAM 131, and provide the location within the RAM 131 to which data will be written, as applied on lines 138, or from which data will be read. In the former case, the PUSH signal generated by OR array 126 is received at a write enable (W) terminal of RAM 131 to permit enabling of the RAM 131 for writing.

Data read from RAM 131 is conducted via signal lines to a set of ten enable/disable buffers 137 which are in turn connected to the set of signal lines 26 carrying the LOAD ADDRESS signals. The buffers 137, and a tri-state buffer 139, receive the POP signal generated by OR array 126 at a true and a complemented enable terminal, respectively. Tri-state buffers 139 are located on the signal lines 262 before their connection to the buffers 137.

Although not shown in FIG. 1, in the interests of clarity, the counter 133 employed within stack 130 can generate a STACK FULL and a STACK EMPTY signal indicative of the contents of the counter 133 being seven, or zero, respectively.

Generally, the operation of stack 130 is similar to that of last-in, first-out (LIFO) stack mechanisms and will be understood by those skilled in the art. Briefly, reception of a PUSH signal on line 132 causes the contents of counter 240, representing the present "state", to be transferred to the stack 130 via signal lines 138. The present state is then stored at the current position represented by a stack "pointer" on the stack 130; the term used in the art being "pushed" onto the stack. The value of the stack pointer is then updated to reflect the pushing of this present state onto the stack 130. A converse "POP" operation is performed by reception of a POP signal on line 134, which causes the contents of the stack 130, at the position represented by the current value of the stack pointer, to be transferred to the counter 240 via signal lines 136. The state value so popped replaces the contents of counter 240. The push and pop operations are synchronized by means of the clock signal received by the counter 240 and stack 130.

Stack 130, in a preferred embodiment, employs an internal incrementer, not shown in FIG. 2, which increments by one each state count value received from counter 240 prior to storage in the stack, i.e., when the PUSH signal is asserted on signal line 132. When the POP signal is inserted on signal line 134, the most-recently value stored on stack 130, i.e., the state count value plus one, is transferred to counter 240.

The buffers 137, internal to the stack 130, and the tri-state buffers 139 receive the POP signal, and the counter 240 becomes non-responsive to LOAD ADDRESS signals generated by the control-sequencing OR array 126 while the POP signal is asserted. Assertion of the POP signal also causes the counter 240 to internally set the LOAD signal HIGH, irrespective of the LOAD signal generated by the OR array 126, and the contents of the stack 130 is then transferred to the counter 240 via the tri-state buffers 139, as will be appreciated by those skilled in the art. Assertion of the CLR signal on line 266 causes the value of the stack pointer to be reset to a predetermined value, such as zero.

By pushing the contents of counter 240 onto stack 130 and simultaneously loading the counter 240 with a jump address generated by OR array 126, a subroutine call can be executed, as will be appreciated by those skilled in the art. By popping the state count so-stored from the stack 130 back to the counter 240, a return from the subroutine can be performed.

It is to be emphasized that loading of counter 240 is a separate operation from pushing the contents of the counter onto stack 130. Accordingly, the stack 130 can be used to store state information without branching, in a particular application.

In a preferred embodiment, stack 130 is eight levels deep, allowing up to eight nested subroutines to be executed. The stack pointer in this instance, operates in a modulo 8 mode, as will be appreciated by those skilled in the art. While not shown in FIG. 1, signals reflecting the status of the stack 130, such as STACK FULL and STACK EMPTY signals, can be generated by stack 130 and conducted to the AND array 122 for use therein in preventing stack "overflow" and "underflow".

The programming of the PLC device 100 of the instant invention is preferably done via high level language (HLL) constructs. Provision of the high level RAM 110 and stack 130 circuit elements within the PLC 100 facilitates this programming and the consequent understandability of the resulting program. An exemplary syntax is shown in the accompanying table

TABLE

Syntax of High Level Language

| Statement Type | Statement Name | Parameters | Meaning |
|---|---|---|---|
| DEFINE | INPINS | Signal Names | Define signal names |
| | OUTPINS | Signal Names | Define signal names |
| STATE-MENT | INPUT PRIOR | | Priority encoding of input signals |
| | OUTPUT | | Generate signals |
| | OUTIN | | Test Feedback signals |
| | BURD n | Buried Register n | Test buried register signals/generate outputs |
| | DELAY | | Hold output signal(s) for certain number of clock cycles |
| | HOLD | Inputs Only | Hold input signal(s) for certain number of clock cycles |
| | RELEASE | Inputs Only | Release input signal(s) from hold |
| | IF THEN ELSE | Statement Label(s) | |
| | WHILE DO | Statement Label(s) | |
| | FOR DO | Statement Label(s) | |
| | CASE OF | Statement Label(s) | |
| | GOTO | Statement Label | Direct Branch |
| | GOTOR | Statement Label | Relative Branch |
| | ENABLE | Outputs Only | Enable Buffer |
| | DISABLE | Outputs Only | Disable Buffer |
| | RESET | | Reset Register |
| | PRESET | | Preset Register |
| | PRELOAD | | Preload Register |
| | GOSUB | Statement Label | Direct Subroutine Branch |
| | GOSUBR | Statement Label | Relative Subroutine Branch |
| | RETURN | | Return from Subroutine |
| | STORE | Address, = Data | Store Data in RAM 110 at Address |
| | RAMREAD | Address, [bit number] | Read RAM 110 at Address and bit number |

The meaning of all the statements shown in the Table, other than the last five, which refer to the stack 130 and the RAM 110, is to be found in the related, copending application "Flexible Programmable Logic Controller", which description is incorporated by reference herein.

The GOSUB and GOSUBR statements are direct and relative subroutine calls, respectively, which are implemented by the stack 130 pushing the current state count onto the stack and loading the counter 240 with the absolute address of the first instruction of the subroutine, in the case of the GOSUB statement or the relative address of the first instruction, in the cae of GOSUBR statement. The RETURN statement is placed in the subroutine to cause a return to the point in the calling routine next-following the GOSUB or GOSUBR statement which invoked the subroutine. The RETURN statement is implemented by popping the state count off the stack 130 onto the counter 240.

The STORE statement is implemented by the RAM 110 which receives signals on line 112 representing the address parameter, and signals on line 116 representing the data parameter. The data is then stored in the appropriate location in RAM 110. The RAMREAD statement causes signals representing the contents of the location within RAM 110 represented by the address parameter to be generated on lines 118 to be fedback to AND array 122. An optional bit number parameter permits selection of a particular bit position within the location be read; the remaining signals generated on lines 118 being generated to correspond to ZERO.

The STORE statement, implemented by the RAM 110 of the PLC 100 of the instant invention, affords the user the ability to externally update the data stored in the RAM 110 via the AND array 122. As this data can be recalled by the RAMREAD statement and fedback to the AND array 122, the RAM 110 can be selectively used for storage of externally-updatable control information, such as generated by a host central processing unit (CPU), and the operation of the PLC 100 can be changed dependent on this control information. The RAM 110 thus provides for storage of external data, in addition to the storage provided by buried registers 200. Typical applications of this use of the RAM 110 is in direct memory access (DMA) controllers, interrupt controllers and video controllers.

The STORE and RAMREAD statements also allow the RAM 110 to be used as a "scratch pad". Using signals generated by the output generation OR array 124, any location within the RAM 110 can be written to or read from. These locations can be used as separate independent counting and timing channels, such as required by a refresh timer for a memory controller.

Alternative embodiments of the instant invention would employ a RAM 110 together with the programmable logic circuit 120, but omitting the counter 240, thereby providing a PAL- or PLA-based device having a RAM for easy storage of data, other than in the buried registers 200. Alternatively, either a RAM 110, or a stack 130, could be employed alone with the PLC device having the counter 240. Other variations and modifications would be suggested by the programmable logic device of the instant invention, and are within the scope of the invention.

We claim:

1. A logic device having a plurality of external terminals and a plurality of input/output ports, comprising:
   programmable array means responsive to signals applied to said external terminals of said device for generating a plurality of logic signals;
   a plurality of programmable output cell means, each receiving one of said logic signals, for storing predetermined ones of said logic signals, and for generating a signal therefrom at a predetermined one of said input/output ports;
   a plurality of storage cell means, each receiving one of said logic signals, for storing predetermined ones of said logic signals and for generating a signal therefrom;
   counter means, receiving at least one of said logic signals, for storing a count value therefrom, for selectably incrementing or decrementing said count value, and for generating therefrom counting signals indicative of said count value; and means receiving said counting signals and at least one of said logic signals, for selectably storing said count value in a last-in, first-out stack, for removing the last-in contents of said stack, and for generating therefrom signals indicative of said last-in contents;

said counter means also receiving said signals generated by said stack means.

2. A logic device according to claim 1 wherein said programmable array means is further responsive to said signals generated by predetermined ones of said programmable output cell means, said storage cell means and said counter means.

3. A logic device according to claim 1 wherein said plurality of logic signals generated by said programmable array means includes a plurality of load address signals, a load control signal, and a push and a pop signal, and wherein said counter means is further responsive to said load address and load control signals, and wherein said counter means and said stack means are further responsive to said push and pop signals, whereupon reception of said load control signal causes said counter means to replace the contents of said counter means with said load address;

whereupon reception of said push signal causes said counter means to generate said signals indicative of said count value and conduct said signals to said stack means for storage therein; and whereupon reception of said pop signal causes said stack means to remove said count value, generate signals therefrom, and conduct said signals to said counter for storage therein.

4. A logic device according to claim 1 wherein said plurality of logic signals generated by said programmable array means includes a clear signal and wherein said counter means is further responsive to said clear signal, and whereupon reception of said clear signal causes said counter means to replace the contents of said counter means with a predetermined count value.

5. A logic device according to claim 4 wherein said stack means is further responsive to said clear signal, and whereupon reception of said clear signal causes all contents of said stack means to be removed.

6. A logic device comprising:
- a first programmable combinatorial array portion having array inputs and intermediate outputs;
- a second combinatorial array portion receiving as inputs said intermediate outputs and having array outputs;
- a random access memory having an address input, a data input and a data output, said address input and said data input each being directly connected to a respective subset of said array outputs and said data output being directly connected to a subset of said array inputs;
- a plurality of external terminals and a plurality of input/output ports, some of said external terminals being coupled to some of said array inputs, said array carrying a plurality of logic signals on said array outputs;
- a plurality of programmable output cell means, each receiving one of said logic signals, for storing predetermined ones of said logic signals, and for generating a signal therefrom at a predetermined one of said input/output ports;
- a plurality of storage cell means, each receiving one of said logic signals, for storing predetermined ones of said logic signals and for generating a signal therefrom; and
- counter means, receiving at least one of said logic signals, for storing a count value therefrom, for selectably incrementing or decrementing said count value, and for generating therefrom counting signals indicative of said count value.

7. A logic device according to claim 6 further comprising means for coupling some of said array inputs to receive said signals generated by said counter means.

8. A logic device according to claim 6 wherein said plurality of logic signals generated by said programmable array means includes a clear signal and wherein said counter means is further responsive to said clear signal, and whereupon reception of said clear signal causes said counter means to replace the contents of said counter means with a predetermined count value.

9. A logic device according to claim 6 further including:
means receiving said counting signals and at least one of said logic signals, for selectably storing said count value in a last-in, first-out stack, for removing the last-in contents of said stack, and for generating therefrom signals indicative of said last-in contents;

said counter means also receiving said signals generated by said stack means.

10. A logic device according to claim 9 wherein said plurality of logic signals generated by said programmable array means includes a plurality of load address signals, a load control signal, and a push and a pop signal, and wherein said counter means if further responsive to said load address and load control signals, and wherein said counter means and said stack means are further responsive to said push and pop signals, whereupon reception of said load control signal causes said counter means to replace the contents of said counter means with said load address; and whereupon reception of said push signal causes said counter means to generate said signals indicative of said count value and conduct said signals to said stack means for storage therein; and wherein reception of said pop signal causes said stack means to remove said count value, generate signals therefrom, and conduct said signals to said counter for storage therein.

11. A logic device according to claim 9 wherein said plurality of logic signals generated by said programmable array means includes a clear signal and wherein said counter means is further responsive to said clear signal, and whereupon reception of said clear signal causes said counter means to replace the contents of said counter means with a predetermined count value.

12. A logic device according to claim 11 wherein said stack means is further responsive to said clear signal, and whereupon reception of said clear signal causes all contents of said stack means to be removed.

13. A programmable logic device having a plurality of input/output ports, comprising:
- a plurality of programmable logic cell means dynamically generating logic signals, and a second plurality of first and second programmable combinatorial logic means for combining a subset of logic signals and for generating a plurality of combinatorial signals therefrom;
- a plurality of programmable output cell means, each receiving one of said combinatorial signals generated by said first programmable combinatorial logic means, for storing predetermined ones of said combinatorial signals, and for generating a signal therefrom at a predetermined one of said input/output ports;

a plurality of storage cell means, each receiving one of said combinatorial signals generated by said second programmable combinatorial logic means, for storing predetermined ones of said combinatorial signals, and for generating a signal therefrom;

counter means, receiving at least one of said combinatorial signals generated by said second programmable combinatorial logic means, for storing a count value therefrom, for selectably incrementing or decrementing said count value, and for generating therefrom counting signals indicative of said count value, and means receiving said counting signals and at least one of said combinatorial signals generated by said second programmable combinatorial logic means, for selectably storing said count value in a last-in, first-out stack, for removing the last-in contents of said stack, and for generating therefrom signals indicative of said last-in contents;

said counter means also receiving said signals generated by said stack means.

14. A programmable logic device according to claim 13 wherein said plurality of logic cell means is further responsive to said signals generated by predetermined ones of said programmable output cell means, said storage cell means and said counter means.

15. A programmable logic device according to claim 13 wherein said combinatorial signals generated by said second programmable combinatorial logic means includes a plurality of load address signals, a load control signal, and a push and a pop signal, and wherein said counter means is further responsive to said load address and load control signals, and wherein said counter means and said stack means are further responsive to said push and pop signals, whereupon reception of said load control signal causes said counter means to replace the contents of said counter means with said load address;

whereupon reception of said push signal causes said counter means to generate said signals indicative of said count value and conduct said signals to said stack means for storage therein; and wherein reception of said pop signal causes said stack means to remove said count value, generate signals therefrom, and conduct said signals to said counter for storage therein.

16. A programmable logic device according to claim 13 wherein said combinatorial signals generated by said second programmable combinatorial means includes a clear signal and wherein said counter means is further responsive to said clear signal, and whereupon reception of said clear signal causes said counter means to replace the contents of said counter means with a predetermined count value.

17. A programmable logic device according to claim 20 wherein said stack means is further responsive to said clear signal, and whereupon reception of said clear signal causes all contents of said stack means to be removed.

18. A programmable logic device according to claim 13 wherein said programmable logic cell means is a programmable AND array.

19. A programmable logic device according to claim 13 wherein said first and second programmable combinatorial logic means are programmable OR arrays.

20. A programmable logic device according to claim 13 wherein said programmable output cell means comprises:

register means, responsive to a clock signal, receiving said combinatorial logic signal, for registering said logic signal and for generating therefrom a registered signal;

output enable control means responsive to a predetermined one of said logic signals generated by said logic cell means and the status of a programmable fusible link, for selectively generating therefrom an output enable signal and an output disable signal, in response to said predetermined logic signal; and input/output means receiving said output signal, responsive to said output enable and disable signals, for selectively generating therefrom said output signal at said predetermined input/output port, and for receiving a signal received at said predetermined input/output port.

21. A logic device having a plurality of external terminals and a plurality of input/output ports, comprising:

programmable array means responsive to signals applied to said external terminals of said device for generating a plurality of logic signals;

a plurality of programmable output cell means, each receiving one of said logic signals, for storing predetermined ones of said logic signals, and for generating a signal therefrom at a predetermined one of said input/output ports;

a plurality of storage cell means, each receiving one of said logic signals, for storing predetermined ones of said logic signals and for generating a signal therefrom;

counter means, receiving at least one of said logic signals, for storing a count value therefrom, for selectably incrementing or decrementing said count value, and for generating therefrom counting signals indicative of said count value;

means receiving said counting signals and at least one of said logic signals, for selectably storing said count value in a last-in, first-out stack, for removing the last-in contents of said stack, and for generating therefrom signals indicative of said last-in contents;

said counter means also receiving said signals generated by said stack means; and memory means receiving predetermined ones of said logic signals, "data" signals, for selectably storing said data signals and for generating signals indicative of said stored data.

22. A logic device according to claim 21 wherein said programmable array means is further responsive to said signals generated by predetermined ones of said programmable output cell means, said storage cell means and said memory means.

23. A logic device according to claim 21 wherein said plurality of logic signals generated by said programmable array means includes a plurality of load address signals, a load control signal, and a push and a pop signal, and wherein said counter means is further responsive to said load address and load control signals, and wherein said counter means and said stack means are further responsive to said push and pop signals, whereupon reception of said load control signal causes said counter means to replace the contents of said counter means with said load address;

whereupon reception of said push signal causes said counter means to generate said signals indicative of said count value and conduct said signals to said stack means for storage therein; and whereupon reception of said pop signal causes said stack means to remove said count value, generate signals therefrom, and conduct said signals to said counter for storage therein.

24. A logic device according to claim 21 wherein said plurality of logic signals generated by said programmable array means includes a plurality of memory address and write enable signals and wherein said memory means has a plurality of storage locations each having a predetermined address, said memory means further responsive to said memory address and write enable signals, and whereupon reception of said write enable signal causes said memory means to replace the contents of said storage location having the address represented by said address signals with said data.

25. A logic device according to claim 21 wherein said plurality of logic signals generated by said programmable array means includes a clear signal and wherein said counter means is further responsive to said clear signal, and whereupon reception of said clear signal causes said counter means to replace the contents of said counter means with a predetermined count value.

26. A method of operating a PAL/PLA device having a first programmable combinatorial logic array portion responsive to signals applied to external terminals of said device, having a second combinatorial logic array portion responsive to signals from said first logic array portion, and having a state counter, and a last-in, first-out stack of depth $p > 1$, comprising the step of causing said state counter to count at desired times, and further comprising the step of programming said logic array portions to generate signals to perform the subroutine-invoking steps of:

(a) transferring the contents of said counter to said stack ("push");

(b) incrementing (modulo p) a stack pointer; and (c) loading said counter with a desired jump address value and providing the count value output of said counter as inputs to said first programmable combinatorial logic array portion.

27. A method according to claim 26 further including the performance, in response to signals generated by said logic array portions, of the subroutine-return steps:

(d) loading said counter with the contents of the top of said stack (pop); and (e) decrementing (modulo p) said stack pointer.

28. A method according to claim 26 further including the performance, in response to signals generated by said logic array portions, of the clear step:

(f) clearing said stack with a predetermined value.

29. A PAL/PLA device comprising:

a first programmable combinatorial array portion having array inputs and intermediate outputs;

a second combinatorial array portion receiving as inputs said intermediate outputs and having array outputs;

a last-in first-out stack having a depth $p > 1$, and having a push input, a pop input, a status word input and a status word output, said push input being coupled to receive a first one of said array outputs and said pop input being coupled to receive a second one of said array outputs, said stack having means for storing a status word from said status word input in response to a signal on said push input and for presenting in a last-in first-out manner on said status word output, in response to signals on said pop input, status words previously stored by said stack; and means for providing a subset of said array outputs to said status word input of said stack, and for providing said status word output of said stack to a subset of said array inputs.

30. A logic device according to claim 29, wherein said stack further has a "full" output and an "empty" output, said "full" and "empty" outputs being coupled to respective array inputs.

31. A PAL/PLA device comprising:

a first programmable combinatorial array portion having array inputs and intermediate outputs;

a second combinatorial array portion receiving as inputs said intermediate outputs and having array outputs;

a last-in first-out stack having a depth $p > 1$, and having a push input, a pop input, a status word input and a status word output, said push input being coupled to receive a first one of said array outputs and said pop input being coupled to receive a second one of said array outputs, said stack having means for storing a status word from said status word input in response to a signal on said push input and for presenting in a last-in first-out manner on said status word output, in response to signals on said pop input, status words previously stored by said stack;

a status register having a data input and a data output;

first means for coupling said data output of said status register to a subset of said array inputs and to said status word input of said stack; and second means for coupling said status word output of said stack to said data input of said status register.

32. A device according to claim 31, wherein said first means for coupling comprises electrical conductors connecting said data output of said status register to said status input of said stack.

33. A device according to claim 31, wherein said status register comprises a pre-loadable counter including counting circuitry therein.

34. A device according to claim 31, wherein said status register further has a load input coupled to one of said array outputs.

35. A logic device according to claim 31, wherein said stack further has a "full" output and an "empty" output, said "full" and "empty" outputs being coupled to respective array inputs.

36. A logic device comprising:

a first programmable combinatorial array portion having array inputs and intermediate outputs;

a second combinatorial array portion receiving as inputs said intermediate outputs and having array outputs;

a last-in first-out stack having a depth $p > 1$, and having a push input, a pop input, a status word input and a status word output, said push input being coupled to receive a first one of said array outputs and said pop input being coupled to receive a second one of said array outputs, said stack having means for storing a status word from said status word input in response to a signal on said push input and for presenting in a last-in first-out manner on said status word output, in response to signals on said pop input, status words previously stored by said stack;

a status register having a data input and a data output;

first means for coupling said data output of said status register to a subset of said array inputs and to said status word input of said stack; and second means for coupling said status word output of said stack to said data input of said status register, wherein said second means for coupling comprises means for coupling to said data input of said status register selectably either a subset of said array outputs or said status word output of said stack.

37. A logic device comprising:

a first programmable combinatorial array portion having array inputs and intermediate outputs;

a second combinatorial array portion receiving as inputs said intermediate outputs and having array outputs;

a last-in first-out stack having depth p > 1, and having a push input, a pop input, a status word input and a status word output, said push input being coupled to receive a first one of said array outputs and said pop input being coupled to receive a second one of said array outputs, said stack having means for storing a status word from said status word input in response to a signal on said push input and for presenting in a last-in first-out manner on said status word output, in response to signals on said pop input, status words previously stored by said stack, said stack further having a "full" output and an "empty" output coupled to respective array inputs;

a pre-loadable counter having a preload control input, a preload data input and a data output, said counter including counting circuitry therein;

means for coupling said data output of said counter to a subset of said array inputs and to said status input of said stack;

means for coupling to said preload data input of said counter selectably either a subset of said array outputs or said status output of said stack; and means for coupling said preload control input of said counter to receive one of said array outputs.

38. A logic device according to claim 37, wherein said counter is a gray code counter.

39. A PAL/PLA device comprising:

a first programmable combinatorial array portion having array inputs and intermediate outputs;

a second combinatorial array portion receiving as inputs said intermediate outputs and having array outputs;

a last-in first-out stack having a depth p > 1, and having a push input, a pop input, a status word input and a status word output, said stack having means for storing a status word from said status word input in response to a signal on said push input and for presenting in a last-in first-out manner on said status word output, in response to signals on said pop input, status words previously stored by said stack;

a counter having a data output, said counter including counting circuitry therein;

means for coupling said data output of said counter to said status word input of said stack; and means for providing said status word output of said stack to a subset of said array inputs.

40. A logic device according to claim 39, wherein said means for providing said status word output of said stack to a subset of said array inputs comprises:

means for loading said counter from said status word output of said stack; and means for coupling said data output of said counter to said subset of said array inputs.

41. A logic device according to claim 40, further comprising means for loading said counter from a subset of said array outputs.

* * * * *